United States Patent [19]
Mentgen

[11] Patent Number: 5,400,756
[45] Date of Patent: Mar. 28, 1995

[54] CONTROL METHOD AND CONTROL ARRANGEMENT FOR AN ADJUSTING DEVICE IN A MOTOR VEHICLE

[75] Inventor: Dirk Mentgen, Schwieberdingen, Germany

[73] Assignee: Robert Bosch GmbH, Stuttgart, Germany

[21] Appl. No.: 123,281

[22] Filed: Sep. 20, 1993

[30] Foreign Application Priority Data

Sep. 18, 1992 [DE] Germany ............... 42 31 227.2

[51] Int. Cl.⁶ .............................................. F02D 7/00
[52] U.S. Cl. .................................................. 123/399
[58] Field of Search .................. 123/399, 688, 350; 364/154

[56] References Cited

U.S. PATENT DOCUMENTS

| | | | |
|---|---|---|---|
| 5,113,823 | 5/1992 | Iriyama | 123/399 |
| 5,115,396 | 5/1992 | Keegan | 364/154 |
| 5,170,769 | 12/1992 | Berger et al. | 123/688 |
| 5,213,078 | 5/1993 | Kolberg et al. | 123/399 |
| 5,279,271 | 1/1994 | Hoffsaess et al. | 123/350 |
| 5,301,646 | 4/1994 | Doi et al. | 123/399 |
| 5,307,777 | 5/1994 | Sasajima et al. | 123/399 |
| 5,318,000 | 6/1994 | Binnewies et al. | 123/399 |
| 5,320,076 | 6/1994 | Reppich et al. | 123/399 |

FOREIGN PATENT DOCUMENTS

2007878  5/1979  United Kingdom ............. 123/399

Primary Examiner—Raymond A. Nelli
Attorney, Agent, or Firm—Walter Ottesen

[57] ABSTRACT

The invention is directed to a control method and a control arrangement for an adjusting device in a motor vehicle wherein at least two signal parameters of the drive signal are pregiven for driving the adjusting device alternately in time intervals. The signal parameters are pregiven to cause the actuating device to assume a desired position in time average.

12 Claims, 4 Drawing Sheets

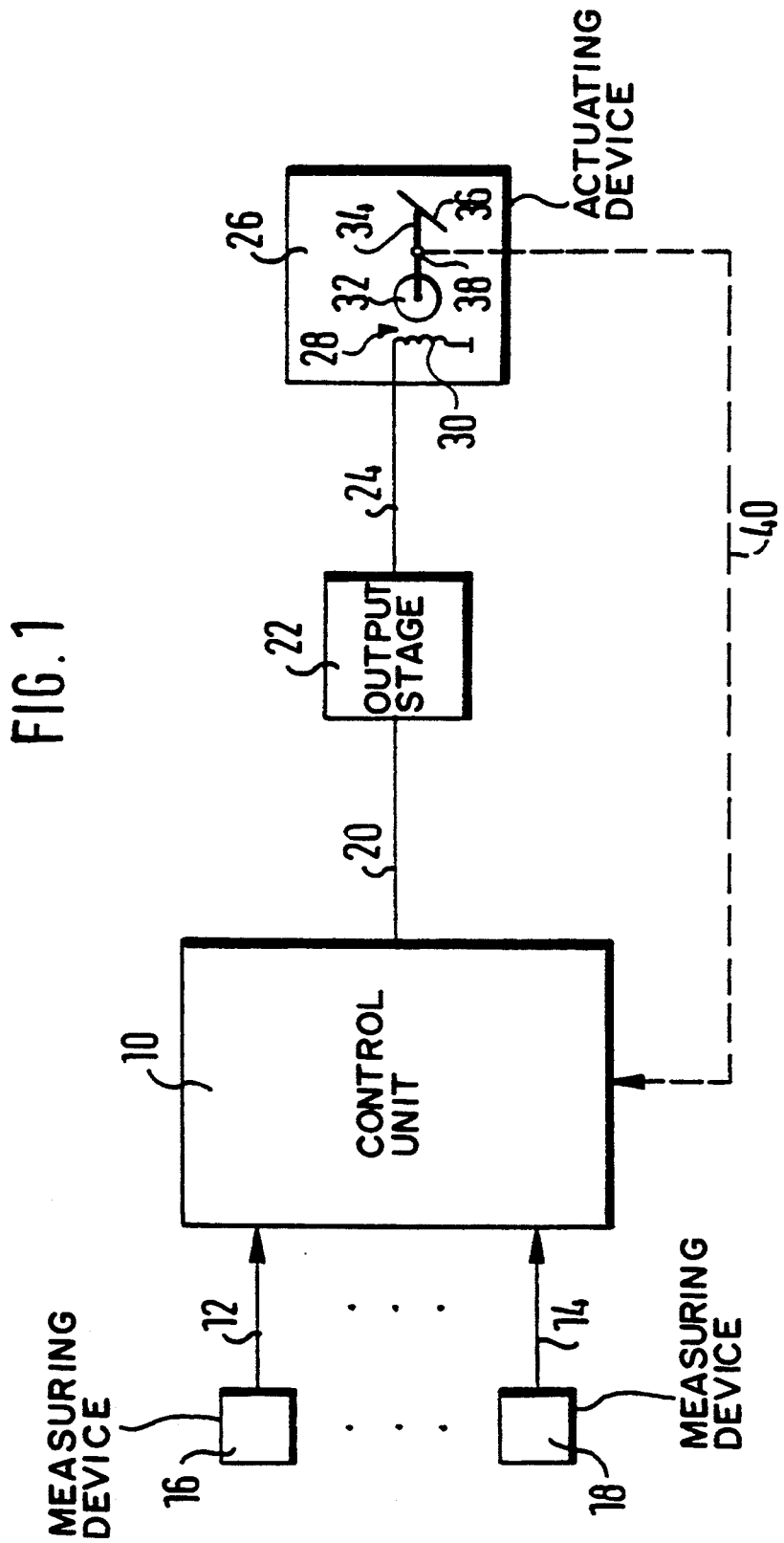

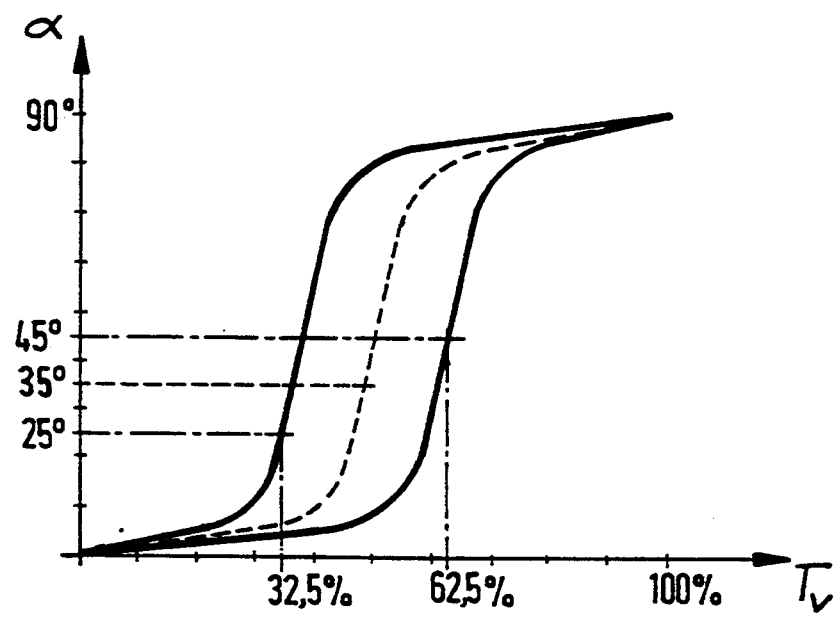
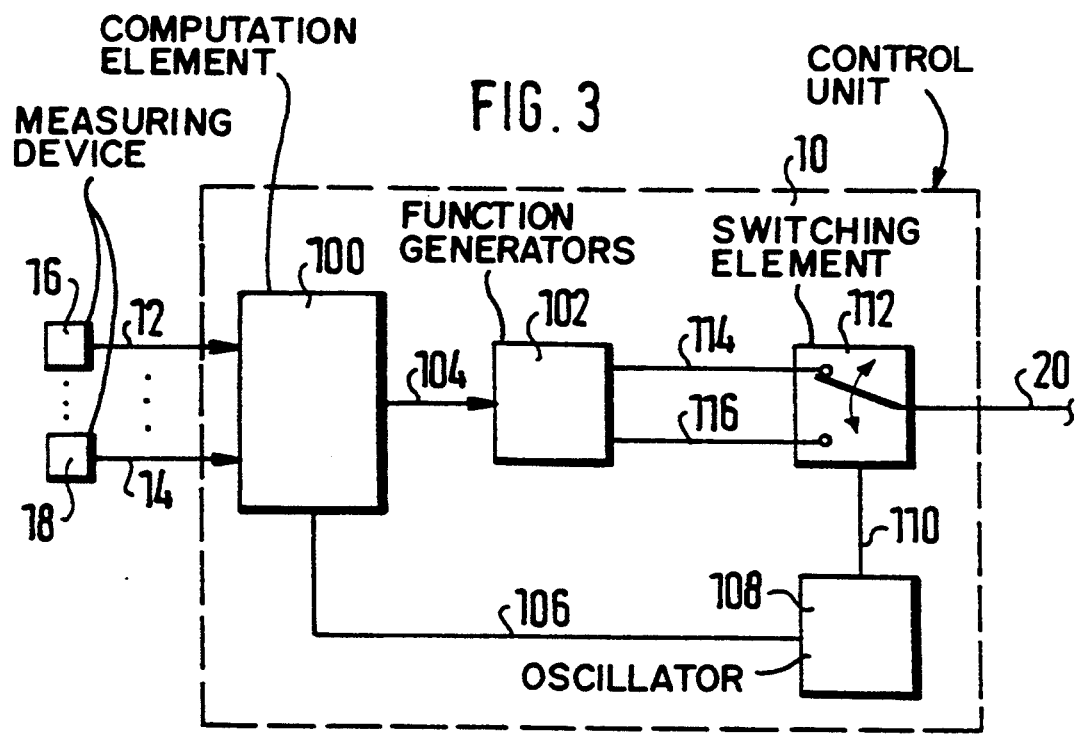

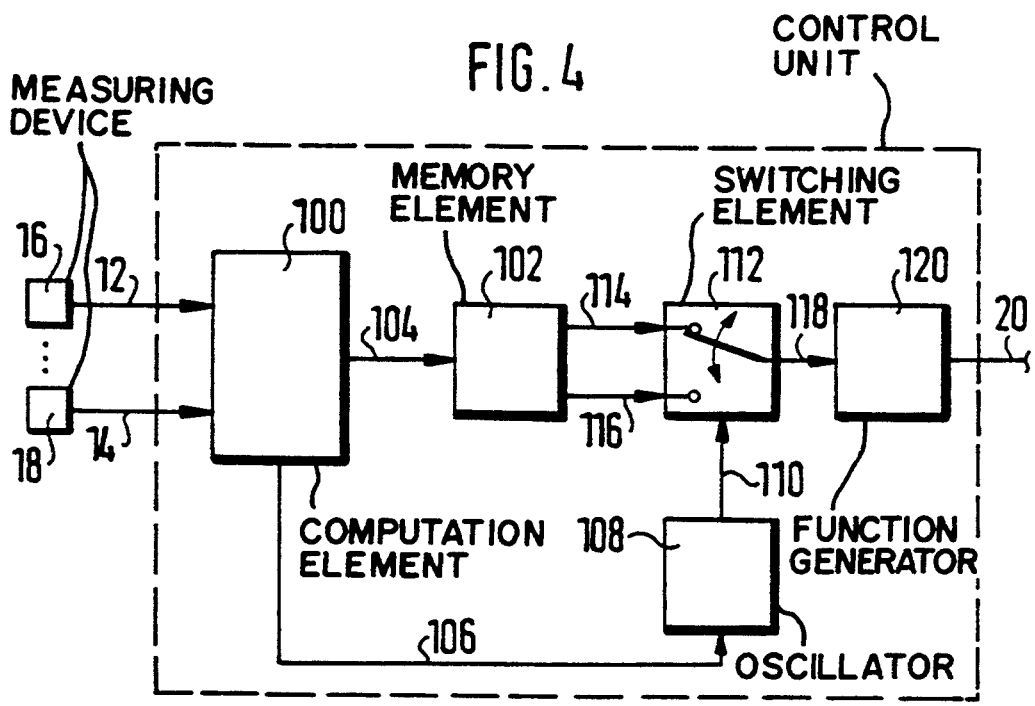
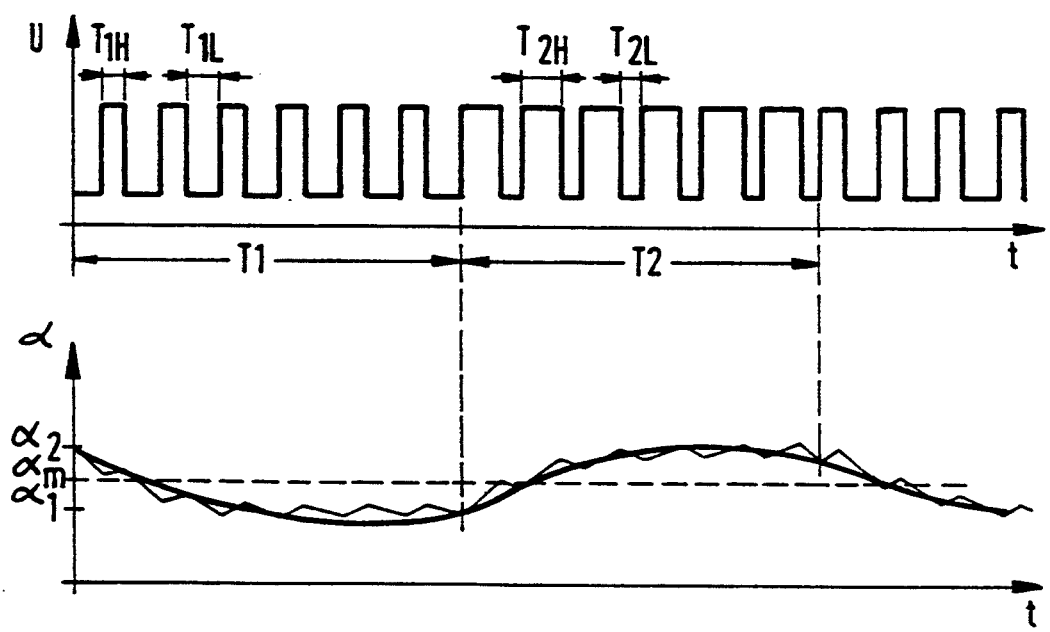

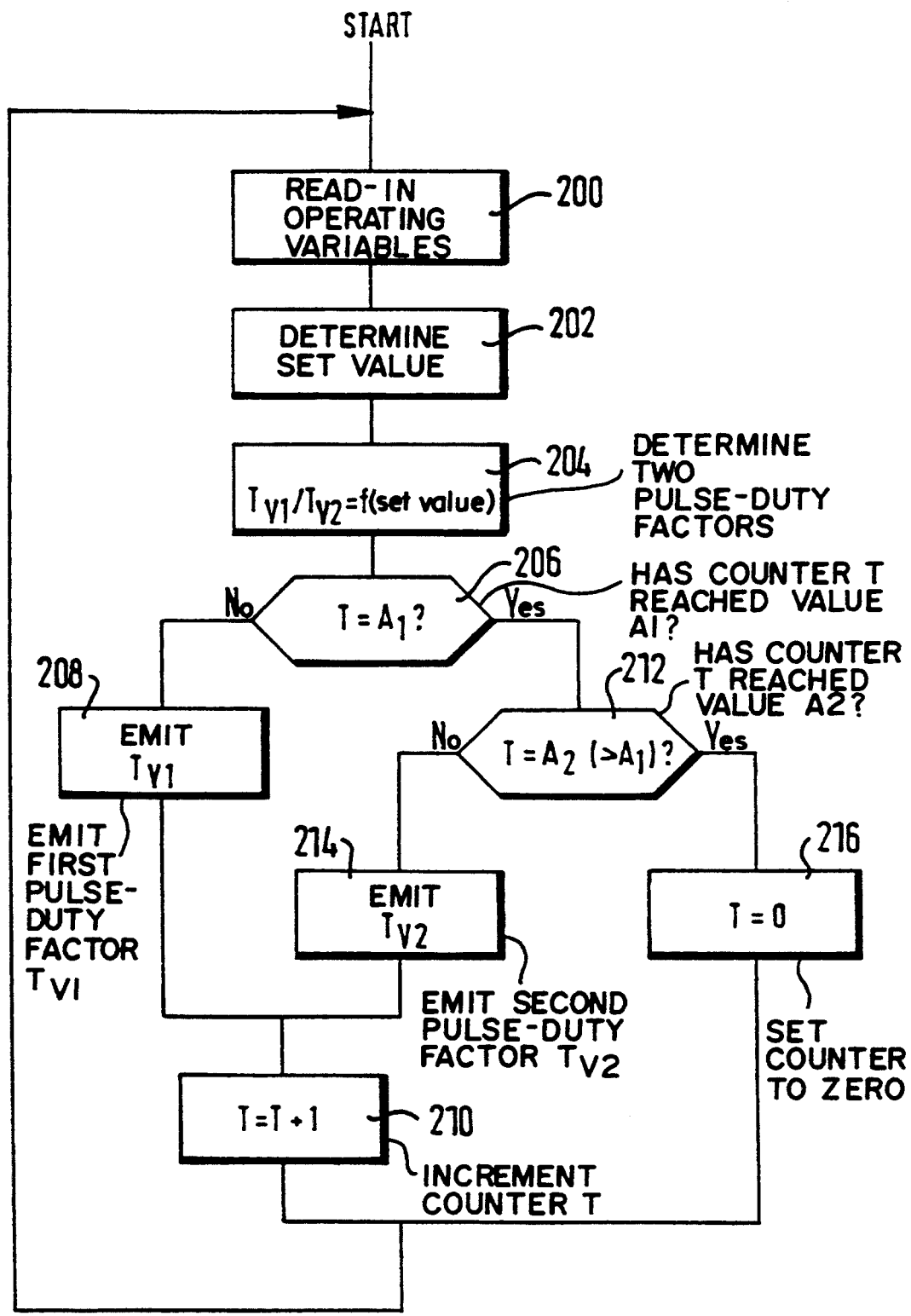

5,400,756

CONTROL METHOD AND CONTROL ARRANGEMENT FOR AN ADJUSTING DEVICE IN A MOTOR VEHICLE

FIELD OF THE INVENTION

The invention relates to a control method for an adjusting device in a motor vehicle having an actuating device operatively connected to the adjusting device which can be, for example, a throttle flap. The actuating device is driven by at least one electrical pulse-shaped signal which, in turn, has at least one changeable signal parameter. The changeable signal parameter for adjusting the actuating device is determined by drive means.

BACKGROUND OF THE INVENTION

A control method and a control arrangement for an adjusting device is disclosed in British Patent 2,007,878. In this arrangement, an actuating device is so adjusted for control purposes that the operating variable to be controlled corresponds to a pregiven desired value. In this case, the operating variable is the idle engine speed. The drive of the actuating device takes place via a clocked drive signal having a fixed frequency with variable pulse width or variable pulse-duty factor.

Actuating devices of this kind are as a rule burdened with a hysteresis with respect to their drive performance. This hysteresis occurs because of slip and friction characteristics or is based on the magnetic remanence of the rotor. Furthermore, regions can occur while driving through the entire actuating range of the actuating device which are characterized by a jump-like performance of the actuator position with reference to the drive signal variable or, within these regions, no defined relationship can be present between the drive signal variable and the actuator position. For this reason, limitations must be accepted with respect to the precision of the drive of such an actuating device.

SUMMARY OF THE INVENTION

In view of the above, it is an object of the invention to provide measures which improve the drive of such an actuating device.

This is achieved in that the drive means alternately provides at least two quantities of the at least one changeable signal parameter of the drive signal in such a manner that the actuating device adjusts to a position in time average.

U.S. Pat. 4,452,200 discloses an arrangement for improving the precision of the drive in connection with adjusting devices for motor vehicles. The precision of the drive is improved by feedback and closed-loop control of the position of the adjusting device which in this case is a throttle flap.

The advantages of the invention are discussed below. A first advantage is that the procedure provided by the invention improves the drive of an actuating device. It is also advantageous that a definitive relationship is obtained between the drive and the adjustment of the actuator with the drive provided by the invention.

It is still another advantage that the drive performance of the invention enables a greater precision of the drive to be obtained. In this way, for systems with position feedback of the actuator, the scanning frequency of this position is reduced and the precision of the position detection is reduced.

A further advantage is that the position controller can be provided with a simpler configuration.

Another advantage is that a position feedback of the actuator can be dispensed with when the actuator is utilized with the drive method of the invention in the context of another control such as an idle engine speed control or an idle charge control.

The procedure provided by the invention has special significance in that, in actuating devices not having a defined characteristic, a defined characteristic of the time-averaged position of the actuator can be provided with the drive according to the invention.

BRIEF DESCRIPTION OF THE DRAWINGS

The invention will now be described with reference to the drawings wherein:

FIG. 1 is a overview block circuit diagram of a control arrangement for an adjusting device in a motor vehicle with the adjusting device being exemplified by a throttle flap in this embodiment;

FIG. 2 is a graph showing the characteristic of the actuator of the actuating device of the control arrangement shown in FIG. 1;

FIG. 3 is a block circuit diagram of a first embodiment showing the procedure provided by the invention;

FIG. 4 is a block circuit diagram showing a second embodiment of the procedure provided by the invention;

FIG. 5 is an embodiment of a flowchart delineating a computer program for executing the method of the invention; and, FIG. 6 is a graph showing the relationship between the drive signal and the actuator position as a function of time.

DESCRIPTION OF THE PREFERRED EMBODIMENTS OF THE INVENTION

FIG. 1 shows a control unit 10 which is supplied with operating variables of the drive unit of a motor vehicle and/or of a motor vehicle itself. The operating variables are supplied by measuring devices 16 to 18 via input lines 12 to 14, respectively. The output line 20 of the control unit 10 is connected to an output stage 22 which, in turn, has an output line 24 connected to an actuating device 26.

As shown in FIG. 1, the actuating device 26 includes at least a drive winding 30 and a rotor 32 which is connected to an actuable element 36 via a mechanical connection 34. In a preferred embodiment, the actuable element 36 is provided for influencing the power of the drive unit of the motor vehicle. The actuable element 36 is the throttle flap of an internal combustion engine in a preferred embodiment. In other advantageous embodiments, the actuable element can be a valve arranged in the bypass parallel to the throttle flap or the actuable element can be a control rod of a Diesel engine. Other applications in the context of a motor vehicle are conceivable such as with respect to an anti-block system.

In preferred embodiments, a position sensor 38 is provided in combination with the actuating device 26. The position sensor 38 has a signal line 40 which is shown as a broken line in FIG. 1 and connects the actuating device 26 to the control unit 10.

In the preferred embodiment, the actuator can be one of the following: a so-called one-winding rotary actuator, that is, a rotary actuator having one drive winding; a two-winding rotary actuator, that is, a rotary actuator having two drive windings; a direct-current motor; or, a step motor.

Depending upon the application, the control unit 10 forms a set value for the actuating device 26. This set value is formed on the basis of the operating variables supplied by the corresponding measuring devices 16 to 18 via the respective input lines 12 to 14. For an idle speed control, this set value is pregiven in dependence upon engine temperature, transmission position, battery voltage, the status of additional consumers such as a climate control and the like and/or the actual engine speed. In other embodiments, other operating variables can be significant. A desired value is especially formed on the basis of the operating variables when position feedback of the actuating device 26 is present. The desired value is set into relationship with the position of the actuating device 26 and a set value is formed which is dependent upon the difference between the desired value and the actual value. The adjustment of the actuating device is dependent upon the position of a driver-actuable element in the case of so-called electronic accelerator-pedal systems having electrical adjustment of the throttle flap.

The set value is converted in the control unit 10 into at least one drive signal which is supplied to the output stage 22. The end stage 22 supplies current to the drive winding 30 of the actuator 28 as required by the drive signal. The drive signal then has at least one changeable signal parameter which is selected in correspondence to the set value. In the preferred embodiment, the drive signal is a pulse-shaped signal having a changeable pulse width, that is, a drive signal having a changeable pulse-duty factor.

In FIG. 2, the characteristic of such an actuator is shown by the solid lines. The rotational angle of the actuator is plotted along the vertical axis whereas the pulse-duty factor of the drive signal is plotted along the horizontal axis. The characteristic of the actuator shows a hysteresis because of the above-mentioned effects; that is, various angular positions result in dependence upon the direction of movement for a given pulse-duty factor. The region of hysteresis is within the area enclosed by the solid characteristic lines. The response of the actuator is undefined in this region.

An actuator characteristic would be desirable which corresponds to the definitive characteristic line shown in FIG. 2 by the dashed line. A definitive characteristic line of this kind is achieved for a mean rotational angle of the actuator in accordance with the invention in that the drive signal is driven in time increments at two different pulse-duty factors which correspond to two different rotational angle settings in accordance with the hysteresis characteristic. Here it is necessary that the difference between the two pulse-duty factors be greater than the hysteresis. A mean rotational angle then adjusts with this measure so that the defined characteristic shown by the broken line is realized.

According to a preferred embodiment, the switchover of the pulse-duty ratios takes place in accordance with a switchover pulse-duty factor of 50% having a fixed frequency. The switchover pulse-duty factor as well as the difference between the two pulse-duty factors is constant in the preferred embodiment over the entire range of the rotational angle of 3° to 87°. According to FIG. 2, a drive signal is formed for adjusting the actuator to 35°. This drive signal alternately shows a pulse-duty factor of 32.5% and 62.5% corresponding to positions of 25° and 45°. The difference is therefore set to 30%. The drive signal time ranges are the same length at 32.5% as those time ranges at 62.5% (switchover pulse-duty factor 50%).

The correspondence of the pulse-duty factors to the rotational angle in accordance with the characteristic shown by the broken line in FIG. 2 (or the drive signal values to be selected for adjusting a desired rotational angle) are obtained experimentally and stored.

These drive signal values can also be dependent upon further external parameters such as air temperature, supply voltage et cetera and must then be stored in characteristic fields.

FIG. 3 shows a block circuit diagram for an embodiment of the invention. The control unit 10 then includes a computer element 100 to which input lines 12 to 14 are connected from the respective measuring devices 16 to 18. In addition, an element 102 is provided which is connected via the line 104 to the computer element 100. The computer element 100 also has the output line 106 which is connected to an oscillator 108. This oscillator 108 controls a switching element 112 via the line 110. The switching element 112 connects the output lines 114 and 116 of the element 102 to the output line 20 of the control unit 10 during intervals of time.

The computer element 100 determines a set value via table assignments or by computation in dependence upon the operating variables supplied by the input lines 12 and 14. The set value is a desired position for the actuating device 26 which the computer element 100 emits in the form of a voltage signal or in the form of digital data to the element 102 via the line 104. In a preferred embodiment, the element 102 comprises function generators which generate two square wave signals corresponding to the adjusting signal. The two square wave signals have changeable pulse-duty factors. Two pulse-duty factors for the output signal are determined in element 102 in correspondence to the set value and are emitted via the lines 114 and 116. The drive signal for the actuating device 26 provided on the line 20 is so formed that, by means of the oscillator 108, a switching element 112 connects the line 114 and the line 116 to the output line 20 during respective time intervals.

Another embodiment is shown in FIG. 4 wherein the element 102 is a storage element wherein the set value is correlated to two pulse-duty factors. These pulse-duty factors are transmitted via the lines 114 and 116 to the switching element 112 which is actuated by the oscillator 108 as described above. The output line 118 of the switching element leads to a function generator (timer) 120 which forms drive signals, preferably square wave signals, in dependence upon the supplied pulse-duty factor values. These output signals are emitted via the output line 20.

In both embodiments, a drive signal is provided on the output line 20 which, for a pregiven first time, defines a pulse signal having the pulse-duty factor supplied on line 114 and, for a second time interval, defines a pulse signal having a pulse-duty factor supplied on the line 116 and so on. The time intervals are adjustable in a preferred embodiment via the line 106 connected to the computation element 100. The time intervals are adjustable, for example, in dependence upon the angular range of the actuating device, engine temperature, supply voltage level and hours of operation. In a preferred embodiment, the time intervals are the same, that is, the switchover pulse-duty factor is 50%.

FIG. 5 shows a flowchart for a second embodiment wherein the procedure provided by the invention is realized as a computer program in the computation element 100. After the subprogram is started and the parameters are initialized, the operating variables are read-in in a first step 200, and in a next step 202, the set value is determined on the basis of tables and/or from computations. Thereafter, in step 204, two pulse-duty factors $T_{V1}$ and $T_{V2}$ are determined in dependence upon the determined set value. The two pulse-duty factors $T_{V1}$ and $T_{V2}$ correspond to the position of the actuator in accordance with the set value pursuant to the predetermined characteristic. A check is made in step 206 as to whether a simultaneously running counter T has reached the value $A_1$. If this is not the case, the pulse-duty factor $T_{V1}$ is emitted on the line 20 in accordance with step 208 and the counter is incremented by the value 1 in the next step 210. The subprogram is then repeated with step 200 at a pregiven time. If it is determined in step 206 that the counter T has reached the value $A_1$, then a check is made in step 212 as to whether the counter has reached the value $A_2$. This value is greater than the value $A_1$ and, in a preferred embodiment, this value is twice as great as the value $A_1$. If the counter has not reached the value, then in step 214, the pulse-duty factor $T_{V2}$ is emitted and the counter is incremented by 1 in the step 210 following the step 214. If it is detected that the counter has reached the value $A_2$ in step 212, then the counter is set to zero in accordance with step 216 and the subprogram is repeated so that the drive signal for the next time interval $A_1$ has a pulse-duty factor $T_{V1}$.

FIG. 6 shows a response of the actuator position as a function of time (FIG. 6b) when the drive method of the invention is applied (FIG. 6a). In FIG. 6a, the drive signal is plotted as a function of time whereas in FIG. 6b, the actuator position $\alpha$ is shown as a function of time. A drive signal having a constant period and a variable pulse width is shown in FIG. 6a. Here, for a first time interval T1, a drive signal having a pulse width $T_{1H}$ and a pulse offtime $T_{1L}$ is used with the sum of both time intervals defining a fixed period T. Another pulse-duty factor according to FIG. 2 is used for a time interval T2. This drive signal has the pulse width $T_{2H}$ and the pulse offtime $T_{2L}$. The sum of these two values results in the same period T.

According to a preferred embodiment, the time intervals T1 and T2 are selected to be equal in amount so that 50% of the drive is with the pulse-duty factor present in the time interval T1 and, in the other half, the drive is with the pulse-duty factor present in the time interval T2.

As mentioned above, the difference of the pulse-duty factors for the time intervals T1 and T2 amounts to approximately 30% in the preferred embodiment and remains constant over the rotation angular range of the actuator at least from 3° to 87° in the region of the hysteresis.

The switchover pulse-duty factor amounts in a preferred embodiment to 50% and takes place at a fixed frequency. This switchover pulse-duty factor is defined as the coefficient of the time interval T2 to the sum of the time intervals T1 and T2.

The coefficient of the time interval T1 or time interval T2 and the period T of the drive signal must be an integer in order to realize the procedure provided by the invention.

The effects of this drive method on the actuator position are shown in FIG. 6b. The pulse-duty factor $T_{V2}$ corresponds to the angle $\alpha 2$ and the pulse-duty factor $T_{V1}$ corresponds to the angle $\alpha 1$. The actuator is driven in the region of the position $\alpha 1$ during the time interval T1. The actuator is moved in the position $\alpha 2$ for the time duration T2 when there is a switchover of the pulse-duty factor to $T_{V2}$. A mean set angle $\alpha M$ occurs in time average according to the trace of the actuator position shown in FIG. 6b. The set angle $\alpha M$ corresponds to the desired set value. The duration of the period of the drive signal is so selected to the sum of the time intervals T1 and T2 that the duration of the period is much less than the sum of these time intervals. In this way, only slight effects are produced on comfort and driving performance.

The embodiment described above is shown with respect to a pulse-shaped drive signal having a fixed frequency and variable pulse width. In other advantageous embodiments, a drive signal of variable period or variable pulse offtime can be selected in lieu of this solution. Furthermore, the signal parameter of the drive signal can also be derived from the drive voltage and/or from the drive current for the actuator or can represent these variables.

Furthermore, the difference between the pulse-duty factors $T_{V2}$ and $T_{V1}$ used in the two time intervals can be selected so as to be changeable. This difference amounts to a constant 30% in the preferred embodiment and can, in another embodiment, be adapted in an advantageous manner to the magnitude of the hysteresis or to the changes of the hysteresis, that is, the adaptation can be dependent on temperature, dependent upon the supply voltage or on the hours of operation of the arrangement or on the actuator position.

In another advantageous embodiment, not only two signal parameter variables are switched at time intervals but several can be switched. For example, it can be advantageous in some applications that the drive signal is formed from three different pulse-duty factors which are switched at respective time intervals for adjusting a predetermined position. Also conceivable is a combination of two and three or more signal parameter variables for the adjustment of a desired position.

The signal parameter variables must not necessarily be two pulse-duty factors; instead, the two signal parameter variables can be two alternating currents or voltages.

It is understood that the foregoing description is that of the preferred embodiments of the invention and that various changes and modifications may be made thereto without departing from the spirit and scope of the invention as defined in the appended claims.

What is claimed is:

1. A method for controlling an actuating device in a motor vehicle having a motor for propelling said motor vehicle, the method comprising:

detecting selected operating variables of at least one of said motor and said motor vehicle;

generating an electric pulse-shaped drive signal for driving said actuating device and said drive signal having a parameter;

computing a set value for said actuating device in dependence upon said selected ones of said operating variables;

computing first and second values of said parameter in dependence upon said set value;

generating a first component of said drive signal with said parameter corresponding to said first value thereof and generating a second component of said drive signal with said parameter corresponding to said second value thereof; and, alternately applying said first and second components of said drive signal to said actuating device for respective time intervals to drive said actuating device to assume said set value.

2. The control method of claim 1 wherein said parameter is a pulse-duty factor of said pulse-shaped drive signal.

3. The control method of claim 2, wherein said first component of said drive signal has a first pulse-duty factor and said second component of said drive signal has a second pulse-duty factor; and, wherein the method comprises the step of switching over between said first and second components in accordance with a pregiven switchover pulse-duty factor.

4. The control method of claim 3, wherein said actuating device can be moved through a predetermined angle of rotation and said actuating device having a hysteresis with reference to the angular position thereof and said values of said parameter corresponding to respective angular positions of said actuating device.

5. The control method of claim 4, wherein said switchover pulse-duty factor is constant and has a fixed frequency.

6. The control method of claim 5, wherein said switchover pulse-duty factor is 50%.

7. The control method of claim 4, wherein the difference between the first pulse-duty factor and the second pulse-duty factor is constant at least for the part of the center region of the hysteresis.

8. The control method of claim 7, wherein the difference is 30%.

9. The control method of claim 7, wherein said difference is greater than the hysteresis.

10. The control method of claim 1, further comprising the steps of:

determining said desired position in dependence upon operating variables of the drive unit of the motor vehicle or of the motor vehicle itself; and, providing that said adjusting device is a throttle for the air or fuel supplied to the drive unit and providing that the actuating device includes an actuator selected from the group including: a single winding rotational actuator; a two-winding rotational actuator, a direct-current motor and a step motor.

11. An arrangement for controlling an actuating device in a motor vehicle having a motor for propelling said motor vehicle, the arrangement comprising:

sensing means for detecting selected operating variables of at least one of said motor and said motor vehicle;

a control unit for generating an electric pulse-shaped drive signal for driving said actuating device and said drive signal having a signal parameter;

said control unit including:

means for determining a set value for said actuating device in dependence upon said selected ones of said operating variables;

means for computing first and second values of said parameter in dependence upon said set value;

means for generating a first component of said drive signal with said parameter corresponding to said first value thereof and for generating a second component of said drive signal with said parameter corresponding to said second value thereof; and, means for alternately applying said first and second components of said drive signal to said actuating device for respective time intervals to drive said actuating device to assume said set value.

12. The arrangement of claim 11, wherein said two values are provided for each desired position of said actuating device so as to cause a defined characteristic of the rotational angle of said actuating device to be formed with respect to said drive signal.

* * * * *